United States Patent
Kim

(10) Patent No.: US 8,160,384 B2
(45) Date of Patent: *Apr. 17, 2012

(54) METHODS OF SUPPRESSING RINGING ARTIFACT OF DECOMPRESSED IMAGES

(75) Inventor: Yeong-Taeg Kim, Irvine, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 1203 days.

This patent is subject to a terminal disclaimer.

(21) Appl. No.: 11/899,519

(22) Filed: Sep. 6, 2007

(65) Prior Publication Data

US 2008/0001976 A1      Jan. 3, 2008

Related U.S. Application Data

(63) Continuation of application No. 10/617,068, filed on Jul. 10, 2003, now Pat. No. 7,339,601.

(51) Int. Cl.
*G06K 9/40* (2006.01)
*H04N 9/74* (2006.01)

(52) U.S. Cl. .......... 382/275; 382/260; 382/264; 348/597

(58) Field of Classification Search .................. None
See application file for complete search history.

(56) References Cited

U.S. PATENT DOCUMENTS

| | | | |
|---|---|---|---|
| 5,933,540 A * | 8/1999 | Lakshminarayanan et al. | ............................ 382/260 |
| 6,295,384 B1 | 9/2001 | Into | |
| 6,532,310 B1 | 3/2003 | Into | |
| 6,667,815 B1 | 12/2003 | Nagao | |
| 6,795,588 B1 | 9/2004 | Nio et al. | |
| 7,079,703 B2 * | 7/2006 | Kriss | ............................ 382/275 |
| 7,373,013 B2 | 5/2008 | Anderson | |
| 2002/0131647 A1 * | 9/2002 | Matthews | ...................... 382/268 |
| 2002/0164084 A1 * | 11/2002 | Baggs | ............................ 382/275 |
| 2003/0039402 A1 * | 2/2003 | Robins et al. | ................. 382/275 |
| 2004/0012675 A1 * | 1/2004 | Caviedes | ....................... 348/180 |
| 2004/0076338 A1 | 4/2004 | Kriss | ............................ 382/275 |
| 2004/0120597 A1 | 6/2004 | Le Dinh | ........................ 382/275 |
| 2004/0125113 A1 * | 7/2004 | Kempf et al. | .................. 345/611 |
| 2005/0031223 A1 | 2/2005 | Kusakabe et al. | ............. 382/275 |
| 2006/0140506 A1 | 6/2006 | Slavin | |
| 2007/0223833 A1 | 9/2007 | Park et al. | |

OTHER PUBLICATIONS

Bushberg et al. The Essential Physics of Medical Imaging, 1994, Williams & Wilkins, pp. 358-359.*
Oguz et al. "Image coding ringing artifact reduction using morphological post-filtering", IEEE Second Workshop on Multimedia Signal Processing, (Dec. 1998), pp. 628-633.*

(Continued)

*Primary Examiner* — Randolph I Chu

(57) ABSTRACT

A suppression method that provides adaptive (i.e., selective) processing of an input picture to generate an enhanced output picture with ringing-like areas of the input picture suppressed. For each window in the input picture, if the window is detected as around a ringing-like area in the picture, then the output pixel for the position of the window comprises the low-pass filtered (i.e., smoothed) pixel in the input picture. If the window is not detected as around a ringing-like area, then the output pixel for the position of the window comprises essentially the unchanged window in the input picture. No blurring is introduced in areas where ringing-like patterns are not detected. The output picture is an enhanced version of the input picture comprising portions of the input picture where ringing-like patterns were not detected, and portions of the input picture with suppressed (i.e., smoothed) ringing-like patterns where detected.

13 Claims, 4 Drawing Sheets

OTHER PUBLICATIONS

U.S. Office Action for U.S. Appl. No. 10/617,068 (Now USPN 7,339,601) mailed Dec. 13, 2005.
U.S. Non-Final Office Action for U.S. Appl. No. 10/617,068 (Now USPN 7,339,601) mailed Apr. 6, 2006.
U.S. Non-Final Office Action for U.S. Appl. No. 10/617,068 (Now USPN 7,339,601) mailed Oct. 4, 2006.
U.S. Final Office Action for U.S. Appl. No. 10/617,068 (Now USPN 7,339,601) mailed Apr. 4, 2007.
U.S. Advisory Action for U.S. Appl. No. 10/617,068 (Now USPN 7,339,601) mailed Jun. 29, 2007.
U.S. Notice of Allowability for U.S. Appl. No. 10/617,068 (Now USPN 7,339,601) mailed Aug. 24, 2007.
U.S. Notice of Allowance and Fees Due for U.S. Appl. No. 11/353,847 mailed Jul. 6, 2009.
U.S. Non-Final Office Action for U.S. Appl. No. 11/353,847 mailed Aug. 1, 2008.
U.S. Non-Final Office Action for U.S. Appl. No. 11/353,847 mailed Dec. 31, 2008.
U.S. Non-Final Office Action for U.S. Appl. No. 11/353,851 (Now USPN 7,418,154) mailed Jan. 2, 2008.
U.S. Notice of Allowance and Fee(s) Due for U.S. Appl. No. 11/353,851 (Now USPN 7,418,154) mailed May 2, 2008.
U.S. Non-Final Office Action for U.S. Appl. No. 11/353,850 mailed Aug. 4, 2008.
U.S. Final Office Action for U.S. Appl. No. 11/353,850 mailed Jan. 26, 2009.

* cited by examiner

METHODS OF SUPPRESSING RINGING ARTIFACT OF DECOMPRESSED IMAGES

This application is a Continuation Patent Application under 35 USC § 120 of U.S. patent application Ser. No. 10/617,068, filed Jul. 10, 2003, now U.S. Pat. No. 7,339,601.

FIELD OF THE INVENTION

The present invention relates generally to video processing, and more particularly to video image compression.

BACKGROUND OF THE INVENTION

The development of modern digital video technology has enhanced the video quality for consumer electronics such as in DVD players and digital TV (DTV) systems, as compared to analog TV systems. However, significant video enhancement shortcomings remain in digital video systems such as DTV systems, including contrast enhancement, brightness enhancement and detail enhancement.

Post processing for decompressed pictures plays an important role in the quality of any digital video system depending on compression technology. This is because artifacts inherently arise as a result of data quantization in data compression. Examples include blocking artifacts, ringing artifacts, mosquito noise, etc. When a digital image or video has been compressed to a low bit rate, such artifacts are especially annoying.

Conventionally, a low-pass-filter has been used to remove the ringing artifacts from the digital picture. However, the low-pass-filter also removes the picture details which introduces blurring artifacts. There is, therefore, a need for a method of suppressing ringing artifacts that commonly arise in decompressed pictures.

BRIEF SUMMARY OF THE INVENTION

The present invention addresses the above shortcomings. In one embodiment, the present invention provides a systematic way of detecting ringing-like areas in a picture by examining local statistics. This allows adaptive suppression of ringing artifacts without introducing blurring to the areas where no ringing artifacts are detected.

A suppression method that provides adaptive (i.e., selective) processing of an input picture to generate an enhanced output picture with ringing-like areas of the input picture suppressed. Subsets of the input picture are analyzed as one or more windows. For each such window in the input picture, if the window is around a ringing-like area in the picture, then the output picture comprises the low-pass filtered (i.e., smoothed) window in the input picture. However, if the window is not around a ringing-like area (i.e., the window is around a non-ringing-like area) then the output picture comprises essentially the unchanged window in the input picture. As a result no blurring is introduced into the input picture in areas where ringing-like patterns are not detected. Therefore, the output picture includes portions of the input picture in which ringing-like patterns were not detected, and portions of the input picture with suppressed ringing-like patterns where detected. The output picture is an enhanced version of the input picture with suppressed (i.e., smoothed) ringing-like patterns.

In another embodiment, the present invention further provides a device that adaptively reduces ringing artifacts in an input image including pixels of image information. In one example, such a device reduces ringing artifacts comprises: a ringing-artifact detector that detects areas of ringing artifacts in a pixel window based on the pixel information, the pixel window including a set of pixels from the input image pixels; an image processor that processes window pixels to generate pixels with reduced ringing artifacts; and a combiner that selects the processed pixels with reduced ringing artifacts in the detected ringing-artifact areas, and generates an output image comprising: (i) the selected processed pixels with reduced ringing artifacts, and (ii) the remaining window pixels.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Overview

Figure 1:
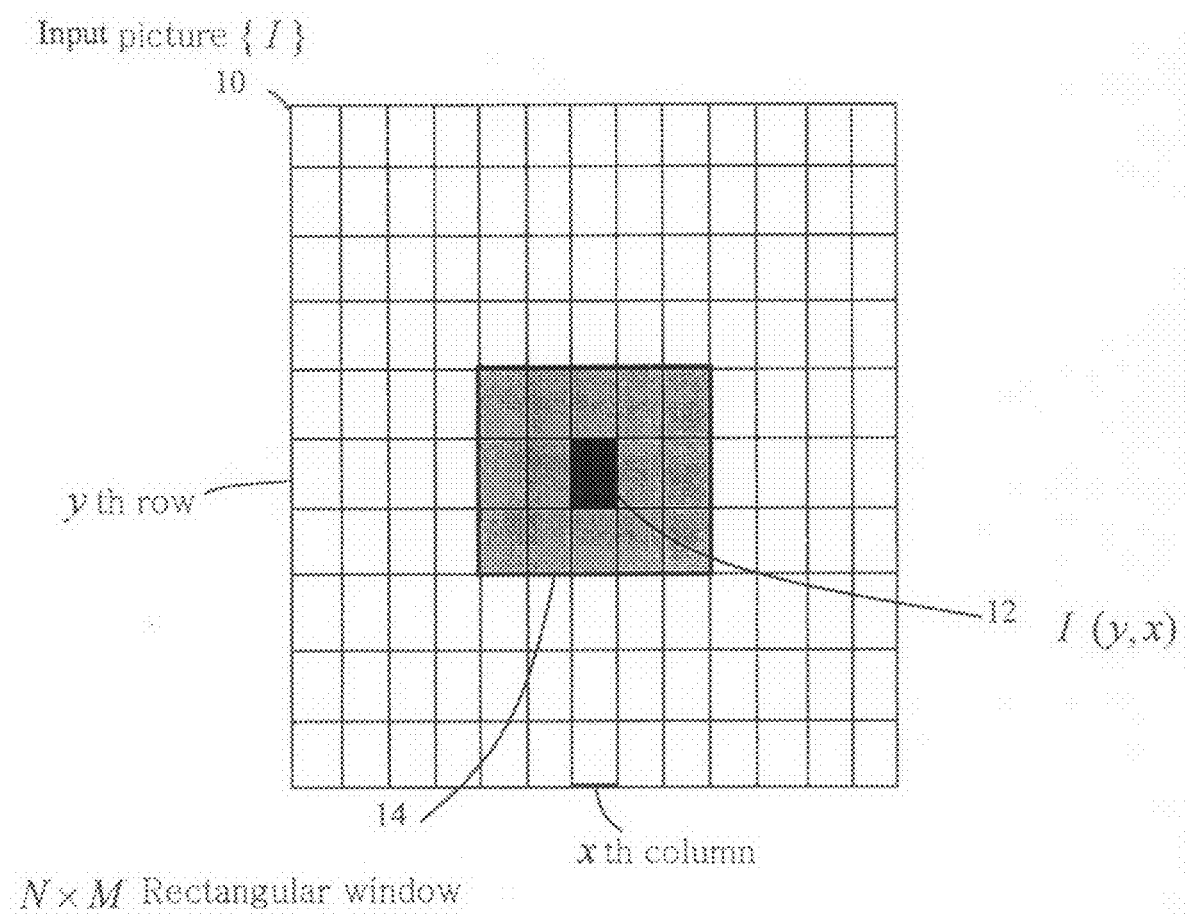
FIG. 1 shows an example window in a digital picture that is processed using an embodiment of an adaptive suppression method according to the present invention.

As noted above, in one embodiment, the present invention provides a method of detecting ringing-like areas in a picture by examining local statistics in the picture. This allows adaptive reduction (e.g., suppression) of ringing artifacts in decompressed pictures, without introducing blurring to the areas where no ringing artifacts are present, according to the present invention. Referring to FIG. 1, in one example, the set $\{I\}$ denotes a decompressed picture (field or frame) 10, and $I(y,x)$ denotes a gradation value of the $x^{th}$ pixel 12 of the $y^{th}$ line of the picture 10.

Figure 2:
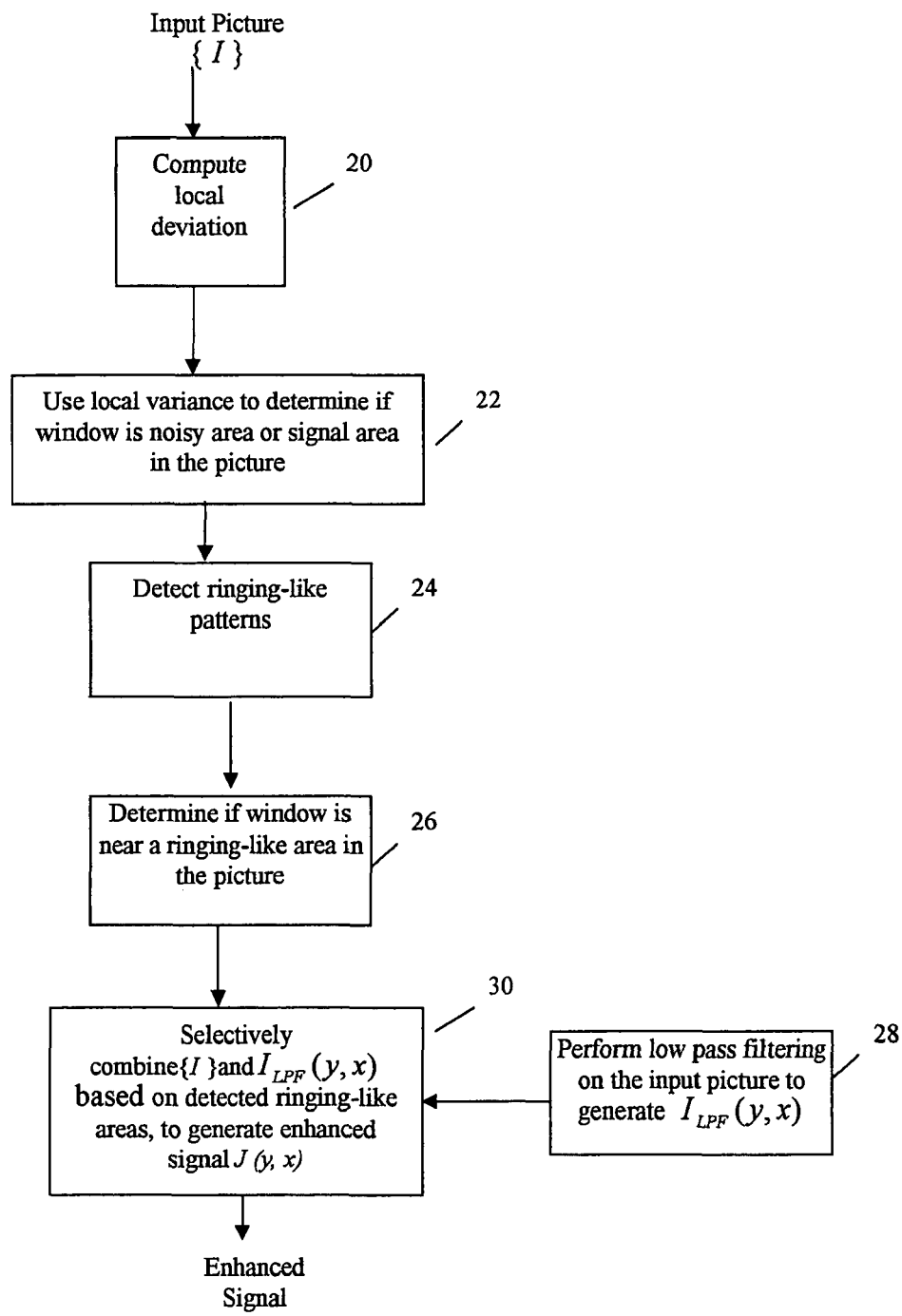
FIG. 2 shows a flowchart of the steps of an embodiment of an adaptive suppression method according to the present invention.

FIG. 2 shows a flowchart of the steps of an example suppression method according to the present invention. The suppression method includes the steps of:

Computing local variance/deviation $\sigma(y,x)$ for each pixel 12 in the image 10 based on neighboring pixels in the NXM window 14 (step 20);

Using the local variances $\sigma(y,x)$ in a signal detection function $\beta(y,x)$ to detect if the window 14 is in a noisy area (small local deviation) or in a good signal area (large local deviation), in the input picture 10 (step 22);

Detecting ringing-like patterns in the window 14 using a ringing-like pattern detection function $g(y,x)$ (step 24);

Using detection of noisy/signal area and detection of ringing-like-patterns in a ringing-like pattern area function $\gamma(y,x)$ to determine if the window 14 is around ringing-like pattern area in the picture 10 (step 26)

Performing low pass filtering on a copy of the input picture 10 (step 28); and

Selectively combining portions of $\{I\}$ with portions of $I_{LPF}(y,x)$ based on detected ringing-like pattern areas, to generate enhanced signal $J(y, x)$ where ringing-like areas are essentially suppressed (step 30).

Such a method provides adaptive (i.e., selective) processing of the input picture 10 to generate an enhanced output picture with ringing-like areas of the input picture 10 suppressed. As such, in the above example, for each input pixel $I_n(y,x)$. Based on such N×M neighbor pixel window 14, if the window 14 is around a ringing-like area in the picture 10, then the output pixel J (y, x) comprises the low-pass filtered (i.e., smoothed) pixel of the input picture. However, if the window 14 is not around a ringing-like area (i.e., the window is around a non-ringing-like area) then the output pixel J (y, x) comprises essentially the unchanged pixel of the input picture which is J (y, x). As a result no blurring (due to smoothing) is introduced into the input picture in areas where ringing-like patterns are not detected. Therefore, the output picture comprises portions of the input picture in which ringing-like patterns were not detected, and portions of the input picture with low pass filtering where ringing-like patterns were detected. Note that this changes from pixel to pixel. The output picture is an enhanced version of the input picture with suppressed (i.e., smoothed) ringing-like patterns.

Example Implementation

In one example implementation described hereinbelow, $I_{LPF}(y,x)$ denotes the gradation value of the $x^{th}$ pixel of the $y^{th}$ line of the picture {I} after low-pass-filtering. A local deviation $\sigma(y,x)$ for $I(y,x)$ in the picture {I} is computed based on the local/neighboring samples (pixels) of $I(y,x)$. This can be performed using a window centered at (y,x) and computing the variance of the samples in the window. Although any arbitrary window shape can be used, an N×M rectangular window is used in the description herein for explanation purposes.

The deviation value $\sigma(y,x)$ can be computed as:

$$\sigma(y,x) = \sqrt{\frac{\sum_{i=1}^{N}\sum_{j=1}^{M}(w_{i,j}-m(y,x))^2}{N \cdot M}} \quad (1)$$

where $w_{i,j}$ is the $(i,j)^{th}$ element of the N×M rectangular window, and m(y,x) is the mean of the samples in the N×M rectangular window, wherein:

$$m(y,x) = \frac{\sum_{i=1}^{N}\sum_{j=1}^{M} w_{i,j}}{N \cdot M}.$$

Because the expression in relation (1) can be expensive to compute, alternatively the following relation can be used to determine the local deviation, wherein:

$$\sigma(y,x) = \frac{\sum_{i=1}^{N}\sum_{j=1}^{M} |w_{i,j}-m(y,x)|}{N \cdot M}. \quad (2)$$

Further, the denominator N·M in relation (2) is a constant, once the dimensions of the window have been determined. As such, the following relation can be used to determine a relative quantity of the local deviation as:

$$\sigma(y,x) = \sum_{i=1}^{N}\sum_{j=1}^{M} |w_{i,j}-m(y,x)|. \quad (3)$$

A computation according to relation (3) is simpler in terms of a hardware implementation than (1) or (2).

Detecting Noisy and Good-Signal Image Areas

Based on the local deviation $\sigma(y,x)$, a signal detection function $\beta(y,x)$ based on $\sigma(y,x)$ is selected, wherein the signal detection function $\beta(y,x)$ satisfies the following three constraints:

As $\sigma(y,x)$ increases, $\beta(y,x)$ approaches 1,
As $\sigma(y,x)$ decreases to 0, $\beta(y,x)$ approaches 0, and
$\beta(y,x)$ monotonically increases as $\sigma(y,x)$ increases.

Other signal detection functions which satisfy the above three constraints can also be utilized.

As described further below, the role of the signal detection function $\beta(y,x)$ is to detect whether the widow is located in a noisy area (i.e., small local deviation), in a signal area (i.e., large local deviation) or between. In this example, the value of $\beta(y,x)$ is bounded as $0<\beta(y,x)\leq 1$. In general, when $\beta(y,x)$ is close to zero, it implies the window is substantially in a noisy area, and when $\beta(y,x)$ is close to one, it implies that the window is substantially in a signal area (for simplicity, it is assumed that the noise level is smaller than the signal level).

Figure 3:
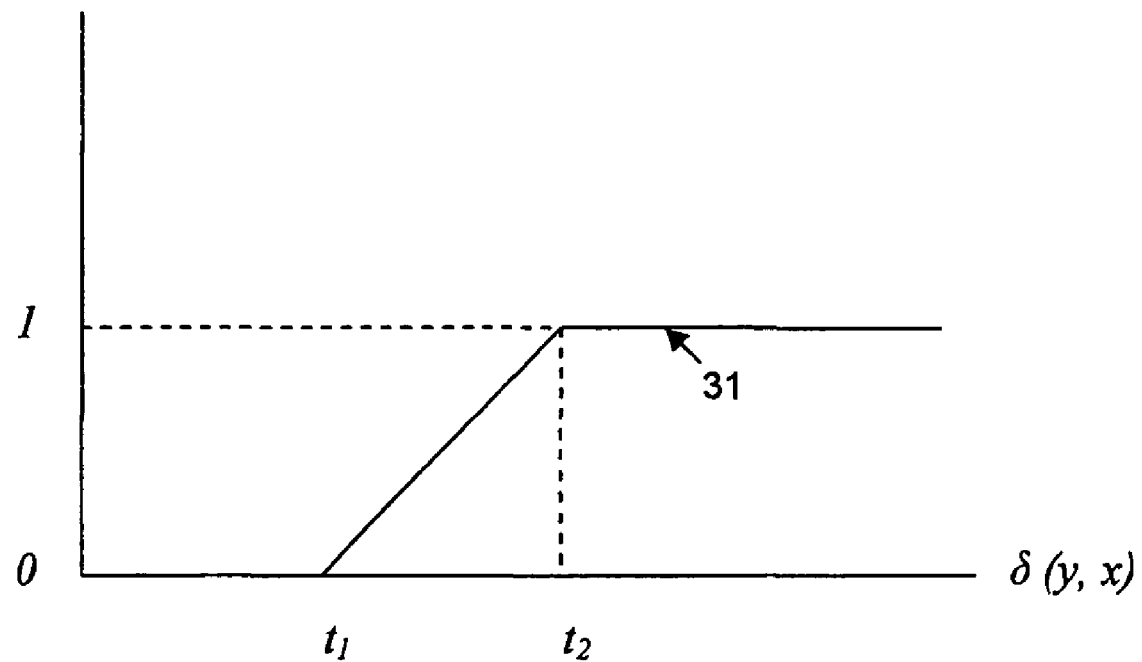
FIG. 3 shows an example curve representing an example relationship between local variances $\sigma(y,x)$ in a signal detection function $\beta(y,x)$.

One example of the signal detection signal $\beta(y,x)$ can be:

$$\beta(y,x) = \begin{cases} 0, & \sigma(y,x) \leq t_1 \\ \frac{\sigma(y,x)-t_1}{t_2-t_1} & t_1 \leq \sigma(y,x) \leq t_2 \\ 1, & \sigma(y,x) \geq t_2 \end{cases} \quad (5)$$

wherein $t_1$ and $t_2$ are some pre-determined constants. As shown by the example curve 31 in FIG. 3, depending on the values of $t_1$ and $t_2$, the characteristics of $\beta(y,x)$ can be defined in association with the value of $\sigma(y,x)$. The ranges for $t_1$ and $t_2$ are dependent on application.

Detecting Ringing-Like Patterns

In detecting a ringing-like pattern in the window, in one example, a ringing like area is recognized as a weak (small) edge area. The weak edge area is indicated by a gradation level difference between a pixel and its neighboring pixels, that is within a selected threshold. In one example, a relatively small gradation level difference indicates that there might be weak (small) edge at the pixel position. A large gradation level difference implies that there might be a strong edge at the pixel position. In real images, ringing does not exhibit a strong edge. Therefore, to detect a ringing-like pattern in the window, a pattern detection function g(y,x) is utilized, wherein g(y,x) includes the components $g_x(y, x)$ and $g_y(y, x)$, such that:

$$g_x(y,x) = \frac{\Delta_x^{min}}{\Delta_x^{max}} \quad (6)$$

where:

$\Delta^{max}_x = \max(|I(y,x-1)-I(y,x)|,|I(y,x+1)-I(y,x)|)$ $\Delta^{min}_x = \min(|I(y,x-1)-I(y,x)|,|I(y,x+1)-I(y,x)|)$ and $$g_y(y, x) = \frac{\Delta_y^{min}}{\Delta_y^{max}} \quad (7)$$

where:

$$\Delta^{max}{}_y = \max(|I(y+1,x)-I(y,x)|, |I(y-1,x)-I(y,x)|)$$

$$\Delta^{min}{}_y = \min(|I(y+1,x)-I(y,x)|, |I(y-1,x)-I(y,x)|)$$

The component $g_x(y, x)$ indicates ringing pattern-like features in the horizontal direction in the window and the component $g_y(y, x)$ indicates ringing pattern-like features in the vertical direction in the window. As such, the ringing-like pattern detection function $g(y,x)$ can be represented as:

$$g(y,x) = \max(g_x(y,x), g_y(y,x)) \quad (8)$$

where $0 \leq g(y,x) \leq 1$.

For a given pixel $I(y, x)$ the larger the gradation level difference between that pixel and its neighboring pixels, then the lower the ringing effect (i.e., $g(y,x)$ decreases). When $g(y,x)$ is close to zero, it implies a substantially non-ringing-like pattern, and when $g(y,x)$ is close to one, it implies a substantially ringing-like pattern.

Detecting Ringing-Like Areas

A combination of the signal detection function $\beta(y,x)$ and the ringing-like pattern detection function $g(y,x)$, provides a ringing-like area detection function $\gamma(y,x)$ which satisfies the constraints in Table 1 below:

TABLE 1

|  | g(y, x) | | |
| --- | --- | --- | --- |
| γ(y, x) | 0 | → | 1 |
| β(y, x) 0<br>↓<br>1 | 0<br>⋮<br>0 | ...<br>⋱<br>... | 1<br>⋮<br>0 |

The arrows in Table 1 indicate a corresponding value changing from e.g., 0 to 1.

One example of the function $\gamma(y,x)$ satisfying said constraints can be:

$$\gamma(y,x) = (1-\beta(y,x)) \cdot g(y,x). \quad (9)$$

In one example, when $\gamma(y,x)=1$, it implies that the window is located around a ringing-like pattern area, whereas when $\gamma(y,x)=0$, it implies that the window is located around a non-ringing-like pattern area.

Generating Enhanced Output Image

Based on the ringing-like area detection function $\gamma(y,x)$, an enhanced output $J(y, x)$ is provided as:

$$J(y,x) = (1-\gamma(y,x)) \cdot I(y,x) + \gamma(y,x) \cdot I_{LPF}(y,x) \quad (10)$$

wherein $J(y, x)$ combines the original sample values $I(y, x)$ and the low-pass-filtered values $I_{LPF}(y, x)$ depending on the degree of ringing-like value $\gamma(y,x)$.

If a ringing-like area is detected (e.g., $\gamma(y,x)=1$), then:

$$J(y,x) = I_{LPF}(y,x)$$

which implies a smoothed output.

If a non-ringing-like area is detected (e.g., $\gamma(y,x)=0$), then:

$$J(y,x) = I(y,x)$$

which implies that no change is made and thus no blurring is introduced.

Relation (10) above represents a point-to-point process, wherein the value of $\gamma(y,x)$ is estimated point-to-point (or, pixel-to-pixel). Hence, relation (10) provides an adaptive de-ringing method according to an embodiment of the present invention.

Although in the preferred embodiment described above, both the signal detection function $\beta(y,x)$ and the pattern-like detection function $g(y,x)$, are used in relations (9) and (10) above, in other embodiments of the present invention, the pattern-like detection function $g(y,x)$ can be used independent of the signal detection function $\beta(y,x)$. As such, in an alternative example, relation (10) above for generating the output picture $J(y, x)$ can modified to be:

$$J(y,x) = (1-g(y,x)) \cdot I(y,x) + g(y,x) \cdot I_{LPF}(y,x) \quad (10a)$$

Adaptive Suppression Device

Figure 4:
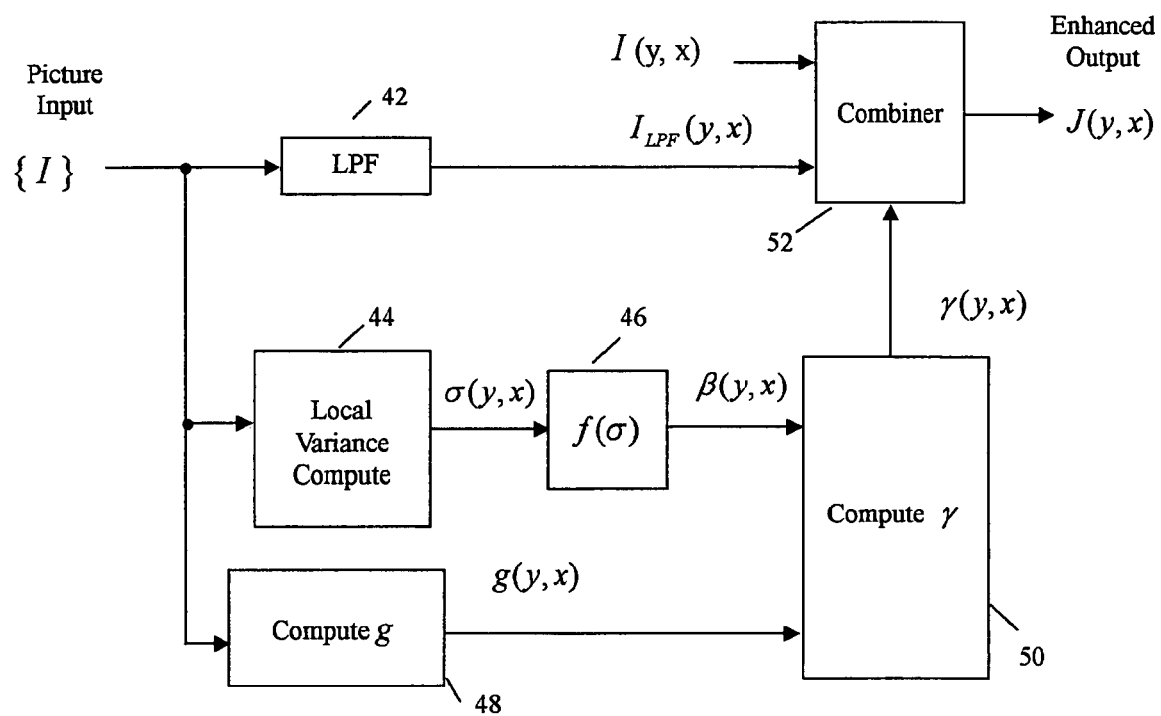
FIG. 4 shows a block diagram of an example architecture of an adaptive suppression device according to the present invention.

FIG. 4 shows a block diagram of an example architecture of an embodiment of an adaptive suppression device 40 according to the present invention, implementing the above method. The device 40 includes: a low-pass filter (LPF) block 42; a local variance compute block 44 that computes the local deviation $\sigma(y,x)$ for a pixel in a window based on neighboring pixels; signal detection function block 46 that uses the local variances $\sigma(y,x)$ to detect location of the window in relation to noisy and signal areas in the input picture; a ringing-like detection function block 48 that detects ringing-like patterns using the function $\beta(y,x)$; a ringing-like area detection block 50 that uses detection of noisy/signal area and detection of ringing-like-patterns in the ringing-like pattern area function $\gamma(y,x)$ to determine if window is around ringing-like pattern area in the picture; and a combiner that selectively combines portions of $\{I\}$ with portions of $I_{LPF}(y,x)$ based on detected ringing-like pattern areas (as described), to generate enhanced output signal $J(y, x)$ representing an output picture in which ringing-like areas are essentially suppressed.

The example suppression device in FIG. 4 can be implemented in many ways known to those skilled in the art, such as for example, as program instructions for execution by a processor, as logic circuits such as ASIC, etc. For example, instead of low pass filtering, other methods of suppressing ringing like artifacts in the input picture can be used according to the present invention. Further, other methods for detecting other artifacts, and suppression of such artifacts can also be utilized according to the present invention. As such, while this invention is susceptible of embodiments in many different forms, there are shown in the drawings and described herein, preferred embodiments of the invention with the understanding that the present disclosure is to be considered as an exemplification of the principles of the invention and is not intended to limit the broad aspects of the invention to the embodiments illustrated. Therefore, the spirit and scope of the appended claims should not be limited to the description of the preferred versions contained herein.

What is claimed is:

1. A device adaptively reducing ringing artifacts in an input image including pixels of image information, comprising:
   a ringing-artifact detector for detecting areas of ringing artifacts in a pixel window based on a gradation level difference between pixels in the pixel window, the pixel window including a set of pixels from the input image pixels;
   an image processor for processing all pixels in the pixel window to generate processed pixels with reduced ringing artifacts;
   an adaptive combiner for selecting pixels with reduced ringing artifacts from the processed pixels, based on the detected ringing-artifact areas, and generates an output image comprising: (i) the selected processed pixels with reduced ringing artifacts, and (ii) the remaining pixels from the input image;
a variance detector for determining local variance of each pixel in the pixel window with respect to neighboring pixels, wherein the local variances inducate presence of noisy areas in the image; and
a signal detector for detecting based on the local variances when the location of the pixel window is proximate a noisy area in the input image,
wherein the adaptive combiner is for selecting pixels with reduced ringing artifacts from the processed pixels, based on the detected ringing artifact areas and the detected pixel window location information, and for generating an enhanced output image comprising: (i) the selected processed pixels with reduced ringing artifacts, and (ii) the remaining pixels from the input image,
whereby the output image includes portions of the input image pixels where ringing artifacts were not detected, and portions of the processed pixels corresponding to areas in the input image where ringing artifacts were detected, the output image being an enhanced version of the input image with ringing artifacts substantially reduced.

2. The device of claim 1, wherein the ringing-artifact detector comprises a pattern detection function for detecting ringing pattern-like features indicating the areas of ringing in the pixel window as a function of gradation level differences between one or more pixels therein.

3. The device of claim 1, wherein the ringing-artifact detector is for determining the gradation level difference between a pixel in the pixel window and neighboring pixels, and for determining whether the gradation level difference is within a selected threshold, indicating ringing-like artifacts proximate the pixel position in the pixel window.

4. The device of claim 1, wherein the image processor includes a low pass filter for low pass filtering to-the pixels in the pixel window regardless of ringing artifacts in the pixel window, to generate processed pixels with reduced ringing artifacts.

5. The device of claim 1, wherein the image processor includes a smoother for reducing ringing artifacts.

6. The device of claim 1, wherein the adaptive combiner is for selecting pixels with reduced ringing artifacts from the processed pixels based on the detected ringing artifact areas and the pixel window location information.

7. The device of claim 6, wherein the selected processed pixels with reduced ringing artifacts correspond to substantially noisy input image locations.

8. The device of claim 1 wherein the input image comprises a decompressed image, said ringing artifacts generated by image compressing and/or decompression.

9. The device of claim 2 wherein the larger the gradation level difference between a pixel and its neighboring pixels, the lower the ringing artifact effect.

10. The device of claim 1 wherein the variance detector is for determining the local deviation in the image.

11. The device of claim 1 wherein the adaptive combiner is for selectively combining portions of input image pixels with portions of processed pixels based on proximity of the pixel window to a ringing artifact area, to generate the output image in which ringing artifact areas are substantially suppressed.

12. The device of claim 1 wherein the ringing-artifact detector comprises:
a pattern detection function for detecting ringing pattern-like features based on gradation level differences between pixels in the pixel window;
a ringing-like area detection function for determining proximity of the pixel window to a ringing-like area in the input image based on the detected noisy area and the detected ringing like pattern; and
wherein the adaptive combiner selectively combines pixels from portions of the input image with portions of the processed pixels based on proximity of pixel the window to a ringing-like area, to generate the output image wherein ringing-like artifacts are substantially reduced.

13. A device adaptively reducing ringing artifacts in an input image including pixels of image information, comprising:
(a) a processor for processing the input image $\{I_n\}$ to generate processed image pixels $I_{LPF}(y,x)$ with reduced ringing artifacts; and
(b) a detector comprising: a local deviation calculator for calculating the deviation $\sigma(y,x)$ for each pixel in a window in the input image $\{I_n\}$, based on neighboring pixels in the window;
a signal detector for using the local deviation $\sigma(y,x)$ in a signal detection function $\beta(y,x)$ to detect when the window is in a noisy area in the input image, wherein a small local deviation indicates a noisy area;
a ringing-like pattern detector for detecting ringing-like patterns in the window using a ringing-like pattern detection function $g(y,x)$;
a ringing-like area detection function for determining proximity of the window to a ringing-like area in the input image based on the detected noisy area and the detected ringing like pattern; and
(c) an adaptive combiner for selectively combining portions of input image {In} with portions of processed image ILPF (y,x) based on proximity of the window to a ringing-like area, to generate enhanced signal J (y,x) in which ringing-like artifacts are substantially reduced.

* * * * *